United States Patent [19]

Young et al.

[11] 4,296,342

[45] Oct. 20, 1981

[54] STARTER MOTOR

[75] Inventors: Donald A. Young; Christopher P. Squires, both of Birmingham, England

[73] Assignee: Lucas Industries, Limited, Birmingham, England

[21] Appl. No.: 151,755

[22] Filed: May 20, 1980

[30] Foreign Application Priority Data

May 25, 1979 [GB] United Kingdom .............. 18384/79

[51] Int. Cl.[3] ........................ F16D 55/22; F02N 11/02

[52] U.S. Cl. ........................................ 310/77; 74/7 A; 192/18 B

[58] Field of Search ............... 310/77, 78, 93; 290/31, 290/38 R; 192/2, 18 R, 18 B; 188/71.1, 72.9, 83

[56] References Cited

U.S. PATENT DOCUMENTS 1,749,319 3/1930 Chryst .
3,177,728 4/1965 Farison ................................ 74/7 A
3,659,681 5/1972 Harvey .............................. 188/72.9
3,922,558 11/1975 Hollyoak .......................... 290/38 A

FOREIGN PATENT DOCUMENTS 949537 2/1964 United Kingdom .................. 310/74
962846 7/1964 United Kingdom .................. 310/74

*Primary Examiner*—J. D. Miller
*Assistant Examiner*—D. L. Rebsch
*Attorney, Agent, or Firm*—Schwartz, Jeffery, Schwaab, Mack, Blumenthal & Koch

[57] ABSTRACT

A starter motor wherein the driven shaft is provided with a brake arrangement including a brake disc carried by the shaft. First and second friction members are engageable with opposite faces of the brake disc respectively and a brake operating member is movable by return movement of the pinion assembly to cause relative movement of the first and second friction members to grip between them the brake disc, so generating a braking force.

13 Claims, 8 Drawing Figures

STARTER MOTOR

Figure 1:
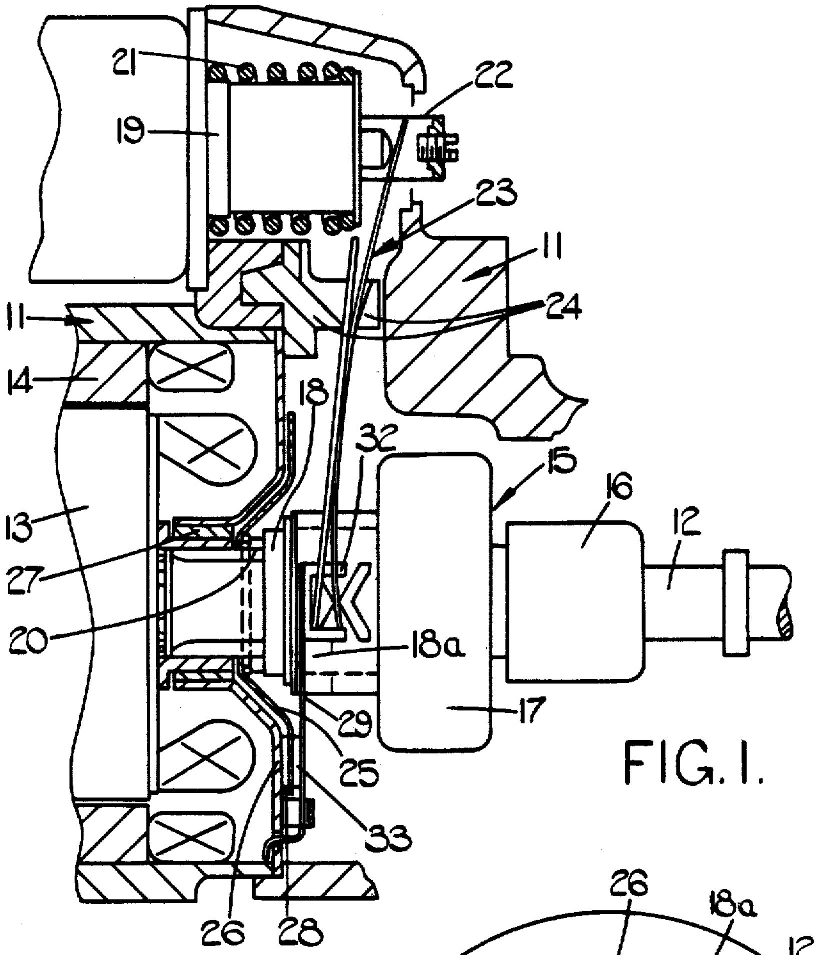

This invention relates to a starter motor for an internal combustion engine.

It is desirable to arrest rotation of the armature shaft and pinion assembly of a starter motor as soon as possible after de-energisation of the starter motor in order to ensure that in a subsequent starting operation performed immediately after the previous de-energisation is performed commencing with the components of the starter motor at rest.

Several previous proposals for braking the rotating parts of the starter motor have involved applying braking force to the pinion assembly. Such arrangements are unsatisfactory in that the driven shaft, usually the armature shaft, tends to overrun the pinion assembly, with the result that the coarse pitch screw thread connection between the driven shaft and the pinion assembly causes axial movement of the assembly towards its operative position thus releasing the braking force, whereupon the pinion assembly is then again urged by its return spring arrangement towards its rest position, restoring the braking force. This axial oscillation is known as "pumping".

It is therefore desirable to effect the braking action on the driven shaft rather than the pinion assembly to avoid "pumping". A previous proposal which effects braking of the driven shaft rather than the pinion assembly utilizes a brake disc rigidly secured to the driven shaft against which a non-rotatable brake disc is urged by the pinion assembly return spring arrangement only when the pinion assembly has returned to its rest position. This construction exhibits a relatively inefficient braking action and is restricted to achieving braking only when the pinion assembly has reached its rest position.

It is an object of the present invention to provide a starter motor wherein the rotatable parts can be braked and wherein the aforementioned disadvantages are minimised.

A starter motor according to the present invention includes, an electric motor, a shaft rotatable by the motor, a pinion assembly carried by said shaft for rotation therewith, the pinion assembly being movable axially relative to the shaft between a rest position and an operative position, resilient means urging the pinion assembly to its rest position, and brake means operable to brake rotation of said driven shaft, said brake means comprising a brake disc mounted on said driven shaft for rotation therewith, a first friction member engageable with one face of the brake disc, a second friction member engageable with the opposite face of the disc, the first and second friction members being opposite one another, and a brake operating member movable in response to return movement of the pinion assembly to cause relative movement of the first and second friction member to grip the brake disc between them, so generating a braking action.

Preferably the brake operating member is a pivotably mounted lever so arranged that relatively large movement of the pinion assembly results in a relatively small relative movement of the friction members.

Desirably said lever is resilient.

Conveniently said first friction member is fixed, said brake disc is capable of limited axial movement relative to the shaft, and said second friction member is movable by said operating member axially towards and away from said first friction member.

Alternatively said brake disc is axially fixed and said first and second friction members are movable towards and away from one another by the movement of the brake operating member.

Preferably the second friction member is carried by said brake operating member.

Desirably the first friction member is carried by a swinging arm, the brake operating member is a lever pivotally connected at one end to said arm intermediate the axis of movement of the arm and the first friction member and said second friction member is carried by said lever intermediate the ends of the lever, said lever being moved by return movement of the pinion assembly to engage the second friction member with the brake disc whereafter further movement of the lever causes swinging movement of said arm to engage the first friction member with the brake disc opposite said second friction member.

Conveniently one or more further sets of brake members, each comprising first and second friction members and an operating member are operable on said brake disc, the sets being spaced around the axis of the disc and each operating member being operated by movement of the pinion assembly.

If desired one or more further brake means can be provided, each comprising a brake disc rotatable with the driven shaft, and first and second friction members engageable with opposite sides of their respective disc, the discs being axially spaced along the shaft.

Preferably the friction members are friction pads.

Desirably the brake means is so arranged as to remain operative until the pinion assembly has moved sufficiently far towards its operative position to cause the pinion gear wheel of the pinion assembly to start to mesh with the ring gear of the associated internal combustion engine, so as to ensure that there will be a braking action of the shaft in the event that movement of the pinion assembly is arrested by tooth-to-tooth abutment of the pinion gear wheel and the engine ring gear.

Figure 2:
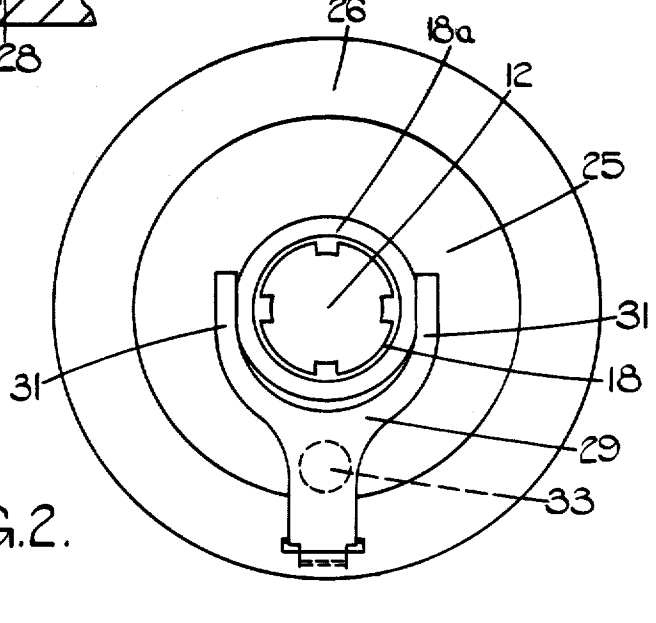
Figure 3:
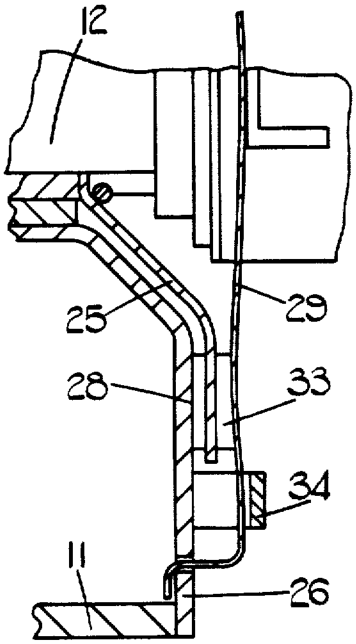
Figure 4:
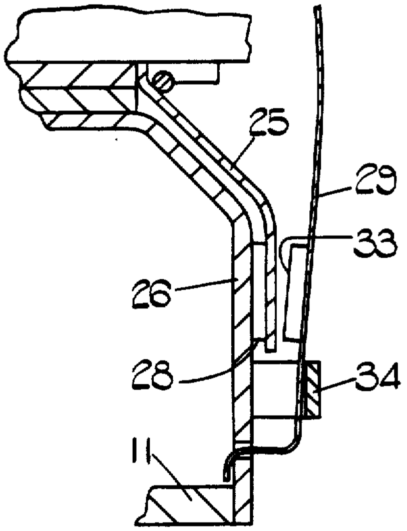
Figure 5:
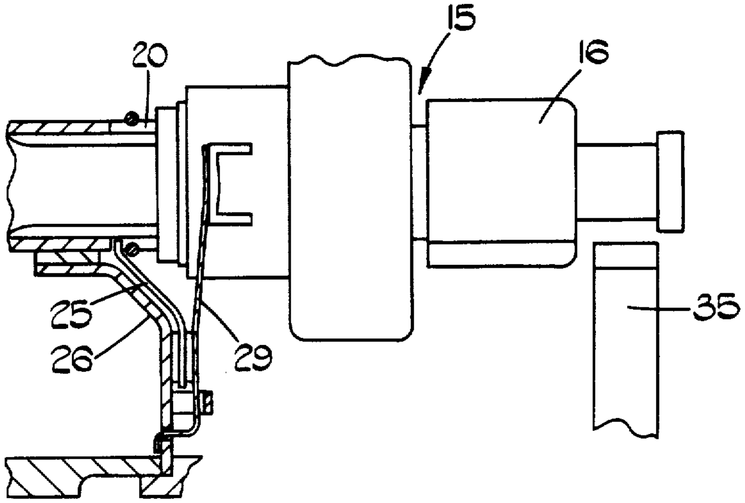
Figure 6:
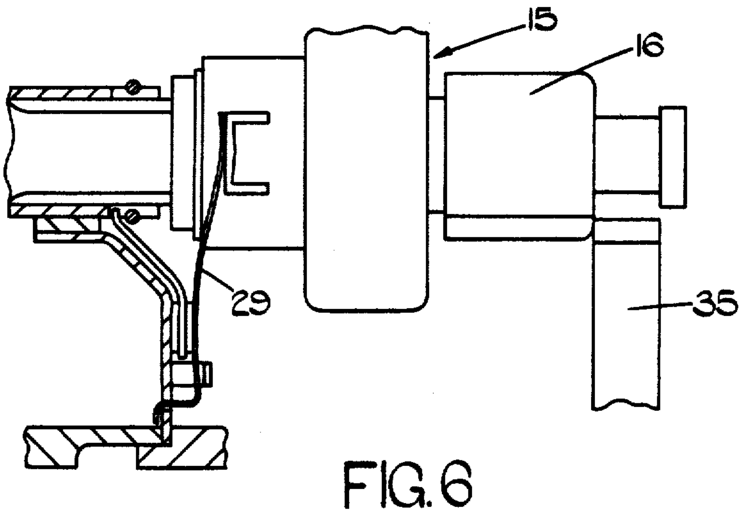
Figure 7:
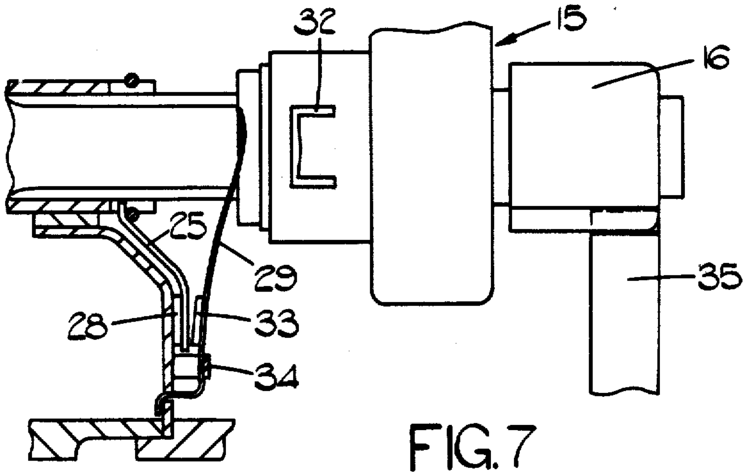
Figure 8:
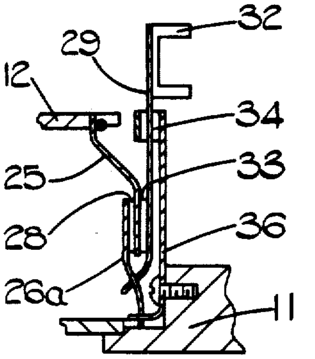

One example of the invention is illustrated in the accompanying drawings wherein:

FIG. 1 is a part-sectional representation of part of a pre-engaged starter motor, FIG. 2 is an end view of part of the brake arrangement of the starter motor shown in FIG. 1, FIG. 3 is a sectional view to an enlarged scale of the brake arrangement shown in FIG. 1, in an operative position, FIG. 4 is a view similar to FIG. 3 of the parts in an inoperative position, FIGS. 5, 6 and 7 are part sectional views illustrating three stages in the operation, and FIG. 8 is a view similar to FIG. 3, to a reduced scale, of a modification.

Referring to the drawings, the pre-engaged starter motor is of the external solenoid type and includes a casing 11 carrying bearings supporting a rotor shaft 12. The rotor shaft 12 is rotatable in the bearings and at one end carries the rotor assembly 13 of an electric motor. The stator assembly 14 of the electric motor is carried by the casing 11 and energization of the electric motor causes rotation of the shaft 12. Adjacent its end remote from the rotor assembly 13 the shaft 12 carried a pinion gear wheel assembly 15 including a pinion gear wheel 16 and a roller clutch 17. The roller clutch 17 includes a sleeve 18 encircling the shaft 12, and having formed on its inner surface a coarse pitch helical screw thread. A region of the shaft 12 extending within the sleeve 18 carries a complementary screw thread whereby relative rotation between the shaft 12 and the sleeve 18 generate axial movement of the sleeve 18 relative to the shaft 12. The extent of such axial movement is limited, and at the limits of the axial movement the sleeve 18 will rotate with the shaft 12. The sleeve 18 defines the input member of the roller clutch 17, the output member of the roller clutch 17 being integral with the pinion gear wheel 16. The pinion gear wheel 16 is axially movable on the shaft 12 with the sleeve 18 and can rotate relative to the shaft 12 as permitted by the roller clutch 17. The roller clutch 17 is conventional, and is arranged to permit the pinion gear wheel 16 to overrun the shaft 12 when the internal combustion engine with which the starter motor is associated fires, and commencing to run with the pinion gear wheel 16 still engaged with the engine ring gear. Thus the roller clutch 17 prevents the engine driving the electric motor of the starting motor.

Secured to the exterior of the casing 11 and having its axis parallel to the axis of the shaft 12 is an electromagnet including an electromagnet winding (not shown) and an electromagnet armature 19. Energization of the electromagnet causes axial movement of the armature 19 (to the left in FIG. 1) against the action of an armature return spring 21. A coupling member 22 carried by the armature 19 and movable therewith couples the armature 19 to one end of a lever assembly 23. The lever assembly 23 extends generally radially towards the shaft 12, and is pivoted intermediate its ends between a pair of fulcrums 24. At its end remote from the armature 19 the lever assembly 23 is coupled to the sleeve 18 and it will be recognised that movement of the armature 19 in response to energization of the electromagnet causes the lever assembly 23 to pivot in a counter-clockwise direction thus pushing the pinion gear wheel assembly 15 to the right to move the pinion gear wheel 16 into engagement with an engine ring gear (not shown in FIG. 1).

It will be noted that the lever assembly 23 comprises a pair of lever elements both of which are resilient, being formed from spring steel strip. The operation of the lever arrangement 23 is not of importance to the present invention. As will become apparent hereinafter the invention is equally applicable to starter motors of the external solenoid pre-engaged type utilizing the more usual solid pivoted lever to couple the electromagnet armature to the pinion gear wheel assembly.

Intermediate the pinion gear wheel assembly 15 and the rotor assembly 13 the shaft 12 carries a brake disc 25. The brake disc 25 is secured to the shaft 12 in a manner such that the disc 25 is constrained always to rotate with the shaft 12, while at the same time being capable of limited axial movement relative to the shaft. Between the brake disc 25 and the rotor assembly 13 is a fixed bracket 26 in the form of an annulus secured at its outer periphery to the casing 11, and defining, at its inner periphery, a bearing 27 for the shaft 12. The bracket 26 and brake disc 25 include annular portions extending in parallel planes transverse to the axis of the shaft 12. Disposed on the face of the bracket 26 presented to the disc 25, and diametrically opposite the electromagnet armature 19 is a first brake pad 28 formed from a wear resistant friction material.

Pivotally mounted on the bracket 26 adjacent its outer periphery is one end of a spring steel brake operating lever 29 the opposite end of which is bifurcated. The two limbs 31 of the bifurcated end of the lever 29 pass on either side of the sleeve 18 and abut lugs 32 integrally formed on the exterior of a moulded synthetic resin collar 18*a* encircling the sleeve 18. A second brake pad 33 is secured to the face of the lever 29 presented to the disc 25, the second brake pad 33 being radially and circumferentially aligned with the brake pad 28. Thus a region of the disc 25 extends between the first and second brake pads 28, 33.

FIG. 1 shows the pinion gear wheel assembly 15 in its rest position, and it can be seen that the lever 29 is pivoted in a counter-clockwise direction about its pivotal connection with the bracket 26 thus engaging the pad 33 with one face of the disc 25 and engaging the opposite face of the disc 25 with the pad 28. The limited axial freedom of the disc 25 ensures that the disc 25 can move in the brake braking condition to ensure that the disc 25 is tightly gripped between the pads 28, 33. Thus the disc is pinched between the pads in the manner of a disc brake and owing to the leverage effected by the lever 29 the armature return spring 21 generates a high braking force at the periphery of the disc 25. It will be recognised that the shaft 12 is braked, the braking forces being accepted by the fixed bracket 26. The braking forces are maximized by ensuring that the braking action takes place at a relatively large diameter (the periphery of the disc 25) and with considerable force owing to the lever action of the lever 29, the pad 33 being relatively close to the pivot axis of the lever, by comparison with the overall length of the lever.

FIG. 3 shows the parts of the brake in their operative position to an enlarged scale by comparison with FIG. 1. It can be seen that the lever 29 is pivotally connected to the brackets 26 by means of a cranked portion of the lever 29 which extends through an aperture in the brackets 26. A retaining strap 34 anchored to the brackets 26 overlies the lever 29 to prevent the lever 29, in the inoperative position of the brake, pivoting sufficiently far to permit disengagement of the cranked portion of the lever from the aperture in the brackets 26.

FIG. 4 shows the brake parts in an inoperative position wherein the lever 29 is arrested in its clockwise pivotal movement by the retaining strap 34. The brake pad 33 is clear of the disc 25, and thus the disc 25 will rub very lightly, with no significant braking action, against the pad 28.

FIGS. 5, 6 and 7 show three stages in the operation. FIG. 5 shows the pinion gear wheel assembly in its rest position with the brake defined by the pads 28, 33 and the disc 25 fully operative. The lever 29 is flexed in the rest position of the pinion gear wheel assembly 15 loading the pad 33 against the disc 25 and the disc 25 against the pad 28. It can be seen that the pinion gear wheel 16 of the assembly 15 is spaced axially from the ring gear 35 of the engine. It is of course implicit that in order for the lever 29 to be flexed in the rest position the spring 21 must exert a stronger spring force than the lever 29. Moreover in the rest position sleeve 18 abuts a collar 20 on the shaft 12. The axial position of the collar 20 thus defines the rest position of the pinion assembly.

FIG. 6 shows the parts during energization of the starter motor, the assembly 15 having been moved to the right by comparison with FIG. 5 to a point at which the pinion gear wheel 16 is just starting to mesh with the teeth of the ring gear 35. The brake however has not at this stage been released, although the loading on the brake has to some extent been relieved. It will be recalled that in the rest position the lever 29 is flexed, and the movement from the rest position to the position shown in FIG. 6 merely relieves some of the stress on the lever 29 without permitting the pad 33 to disengage from the disc 25, and thus without permitting the disc 25 to disengage from the pad 28. The position of the pinion gear wheel assembly 15 shown in FIG. 6, where the pinion gear wheel 16 is about to mesh with the ring gear 15 is the position occupied by the assembly 15 in the event of tooth-to-tooth abutment between the gear wheel 16 and the ring gear 35. In a pre-engaged starter motor should a tooth-to-tooth abutment occur then of course the pinion gear wheel assembly 15 is prevented from moving to its operative position. However, the electromagnet arrangement for moving the pinion assembly 15 to its operative position is arranged to accommodate a tooth-to-tooth abutment condition by permitting the armature of the electromagnet to continue to move against the action of a strong spring normally known as the engagement spring. Thus the electromagnet armature is permitted to move to its operative position wherein it closes an electrical switch to energize the electric motor of the starter motor. Initial rotation of the shaft 12 as the motor is energized disturbs the tooth-to-tooth condition and permits the engagement spring to drive the pinion gear wheel assembly rapidly to its operative position wherein the gear wheel 16 fully meshes with the ring gear 35. However, upon energization of the electric motor of the starter motor in a tooth-to-tooth abutment condition the rotation may be so rapid that the pinion gear wheel assembly 16 cannot move into full mesh under the action of the engagement spring and milling of the gear wheel 16 against the ring gear 35 will take place. By ensuring that the pads 28, 33 are still gripping the disc 25 when the pinion assembly 15 reaches a position equivalent to a tooth-to-tooth abutment condition then a drag is imposed upon the rotation of the shaft 12 by virtue of the brake, and the risk of milling is much reduced.

FIG. 7 shows the pinion assembly 15 in its operative position with the gear wheel 16 fully meshed with the ring gear 35. It can be seen that the lever 29 has flexed back to an unstressed condition, and that the lug 32 has moved out of contact with the lever 29. Thus the lever 29 is in the position shown in FIG. 4 wherein it is retained by the strap 34 with the pad 33 clear of the disc 25 and the disc 25 either of, or very lightly touching the pad 28. Thus clearly no braking action is afforded in the fully meshed condition of the pinion gear wheel 16 and thus the brake mechanism does not retard cranking of the engine by the starter motor.

During return movement of the pinion gear wheel assembly 15 from its operative position then the braking mechanism commences to be effective as the pinion gear wheel 16 disengages from the ring gear 35 thereafter the loading of the brake pads 28, 33 against the disc 25 increases as the lever 29 is flexed from its rest configuration, until the pinion gear wheel assembly 15 reaches its rest position. It will be recognized that the armature return spring 21 is sufficiently strong to overcome the inherent resilience of the lever 29. In the modification shown in FIG. 8 the bracket 26 is dispensed with and the brake disc 25 is rigidly secured to the shaft 12. The first brake pad 28 is carried at one end of a swinging arm 26*a* which is pivoted at its other end to a fixing member 36 carried by the casing 11. The lever 29 again is engaged at its radially innermost end by the lug 32, and is pivotally connected at its opposite end to the arm 26*a* between the ends of the arm 26*a*. The second brake pad 33 is carried by the lever 29 adjacent its pivotal connection with the arm 26*a* and thus again the pads 28 and 33 are in opposition on opposite sides of the disc 25. The strap 34 is formed as an integral part of the retaining member 36. The operation of the braking mechanism is similar to that described above, in that as the pinion assembly 15 approaches its rest position the lever 29 is pivoted about its connection with the arm 26*a* to engage the pad 33 with the disc 25. However, the disc 25 cannot move axially, and immediately the pad 33 engages the disc 25 then the lever 29 tends to move about the point of contact of the pad 33 and the disc 15 thus pivoting the arm 26*a* in a direction to engage the pad 28 with the opposite face of the disc 25. Thus once again the movement of the lever caused by return movement of the pinion assembly 15 serves to pinch the disc 25 between the pads 28, 33 in the manner of a disc brake to achieve a very efficient braking action on the shaft 12. The operation of the arrangement shown in FIG. 8 is otherwise identical to that described above.

In a minor modification of the construction described above the collar 20 is omitted. In this modification the rest position of the pinion assembly is defined by the equilibrium position where the force of the spring 21 balances the spring force of the flexed lever 29.

In a construction alternative to those constructions described above the disc 25 is braked by further similar braking mechanisms. Thus in accordance with the FIG. 1 arrangement one or more further first braking pads 28 are equi-angularly disposed around the axis of the shaft 12 on the bracket 26 and each has aligned therewith, on the opposite side of the disc 25 a further second braking pad 33 carried by a further operating lever 29. The further operating lever or levers 29 are similarly pivoted on the bracket 26 and operated by movement of the pinion assembly 15.

As a further alternative of course one or more further braking arrangements of the kind shown in FIG. 8 can be spaced around the axis of the shaft 12 each operating on the same disc 25 as a result of movement of the pinion assembly 15.

It is to be recognized that if desired further braking discs 25 can be incorporated each with one or more sets of brake pads all operated in response to movement of the pinion assembly 15. The plurality of brake discs 25 will be axially spaced from one another and can each have one or more braking arrangements of the kind shown in FIG. 1 or of the kind shown in FIG. 8.

It will be understood that while all of the various alternative constructions described above are described with reference to a pre-engaged starter motor having an external solenoid, nevertheless the various alternative forms of braking arrangement can be employed in other forms of starter motor, for example, the pre-engaged types of starter motor wherein the electromagnet arrangement is housed within the casing, for example co-axial with the shaft 12.

We claim:

1. A starter motor including an electric motor, a shaft rotatable by the motor, a pinion assembly carried by said shaft for rotation therewith, the pinion assembly being movable axially relative to the shaft between a rest position and an operative position, resilient means urging the pinion assembly to its rest position, and brake means operable to brake rotation of said driven shaft, said brake means comprising a brake disc mounted on said driven shaft for rotation therewith, a first friction member engageable with one face of the brake disc, a second friction member engageable with the opposite face of the disc, the first and second friction members being opposite one another, and a brake operating member movable in response to return movement of the pinion assembly to cause relative movement of the first and second friction member to grip the brake disc between them, so generating a braking action.

2. A starter motor as claimed in claim 1 wherein the brake operating member is a pivotably mounted lever so arranged that relatively large movement of the pinion assembly results in a relatively small relative movement of the friction members.

3. A starter motor as claimed in claim 2 wherein said lever is resilient.

4. A starter motor as claimed in any one of claims 1 to 3 wherein said first friction member is fixed, said brake disc is capable of limited axial movement relative to the shaft, and said second friction member is movable by said operating member axially towards and away from said first friction member.

5. A starter motor as claimed in claim 4 wherein the second friction member is carried by said brake operating member.

6. A starter motor as claimed in any one of claims 1 to 3 wherein said brake disc is axially fixed and said first and second friction members are movable towards and away from one another by the movement of the brake operating member.

7. A starter motor as claimed in claim 6 wherein the first friction member is carried by a swinging arm, the brake operating member is a lever pivotally connected at one end to said arm intermediate the axis of movement of the arm and the first friction member and said second friction member is carried by said lever intermediate the ends of the lever, said lever being moved by return movement of the pinion assembly to engage the second friction member with the brake disc whereafter further movement of the lever causes swinging movement of said arm to engage the first friction member with the brake disc opposite said second friction member.

8. A starter motor as claimed in claim 1 wherein one or more further sets of brake members, each comprising first and second friction members and an operating member are operable on said brake disc, the sets being spaced around the axis of the disc and each operating member being operated by movement of the pinion assembly.

9. A starter motor as claimed in claim 4 wherein one or more further sets of brake members, each comprising first and second friction members and an operating member are operable on said brake disc, the sets being spaced around the axis of the disc and each operating member being operated by movement of the pinion assembly.

10. A starter motor as claimed in claim 6 wherein one or more further sets of brake members, each comprising first and second friction members and an operating member are operable on said brake disc, the sets being spaced around the axis of the disc and each operating member being operated by movement of the pinion assembly.

11. A starter motor as claimed in claim 1 wherein one or more further brake means is provided, each comprising a brake disc rotatable with the driven shaft, and first and second friction members engageable with opposite sides of their respective disc, the discs being axially spaced along the shaft.

12. A starter motor as claimed in claim 1 wherein the friction members are friction pads.

13. A starter motor as claimed in claim 1 wherein the brake means is so arranged as to remain operative until the pinion assembly has moved sufficiently far towards its operative position to cause the pinion gear wheel of the pinion assembly to start to mesh with the ring gear of the associated internal combustion engine, so as to ensure that there will be a braking action on the shaft in the event that movement of the pinion assembly is arrested by tooth-to-tooth abutment of the pinion gear wheel and the engine ring gear.

* * * * *